United States Patent [19]

Stenner

[11] Patent Number: 4,708,027
[45] Date of Patent: Nov. 24, 1987

[54] GEAR MOTOR HOUSING

[76] Inventor: Gustave H. Stenner, 10708 Executive Dr., Jacksonville, Fla. 32225

[21] Appl. No.: 874,707

[22] Filed: Jun. 16, 1986

[51] Int. Cl.⁴ .......................... F16H 1/12; F04B 17/00
[52] U.S. Cl. ................................ 74/421 A; 74/606 R; 417/360; 417/372; 403/373
[58] Field of Search ......... 74/606 R, 421 H, 665 GA, 74/413; 417/360, 372, 410, 423 R; 403/353, 348, 373, 376, 406.1, 405.1, 409.1

[56] References Cited

U.S. PATENT DOCUMENTS

| 2,037,460 | 4/1936 | Dixn | 74/606 R |
| 2,173,339 | 9/1939 | Myers | 74/606 R |
| 2,880,676 | 4/1959 | Succop | 417/410 |
| 2,908,180 | 10/1959 | Swenson | 74/421 A |
| 3,364,772 | 1/1968 | Easton | 74/606 R |
| 3,849,012 | 11/1974 | Krause | 403/316 |
| 4,408,928 | 10/1983 | Steinke | 403/405.1 |
| 4,428,719 | 1/1984 | Hayashibara et al. | 417/423 R |
| 4,496,263 | 1/1985 | Laarhoven | 403/405.1 |
| 4,588,358 | 5/1986 | Rietschle | 417/360 |

Primary Examiner—Cornelius J. Husar
Assistant Examiner—Peter M. Cuomo
Attorney, Agent, or Firm—Arthur G. Yeager

[57] ABSTRACT

Housing for a gear motor having an electric motor, an air circulation fan, several gears in a speed reduction gear train, and a low speed output shaft; the housing being manually disassembleable by pivoting an arm locking the three sections of the housing together, shafts for gears and the output shaft all being journaled in two separable sections of the hosuing such that separation of the sections makes the shafts readily disassembleable manually from the housing.

16 Claims, 17 Drawing Figures

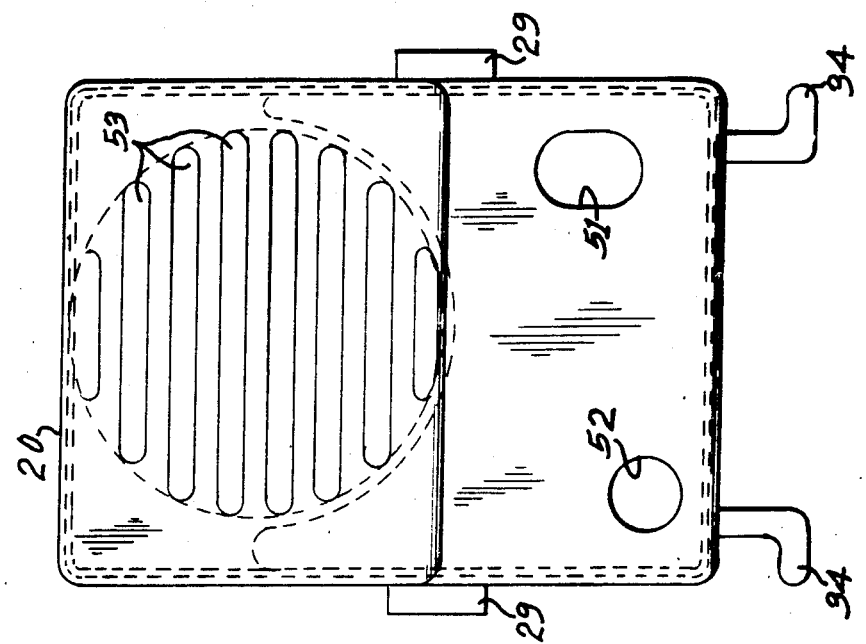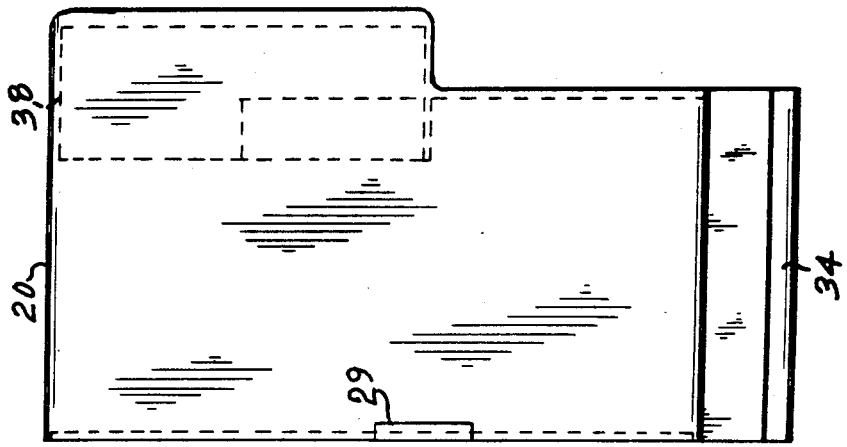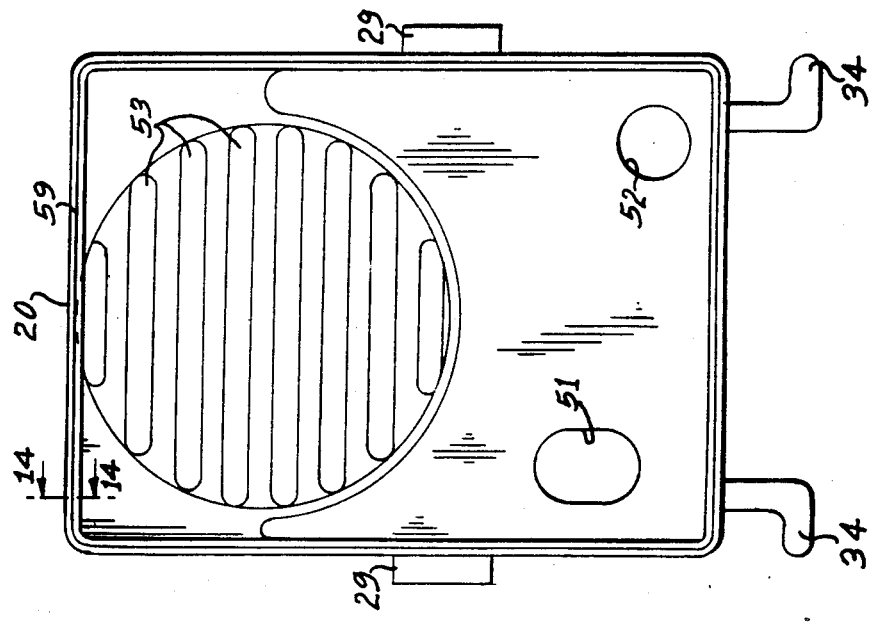

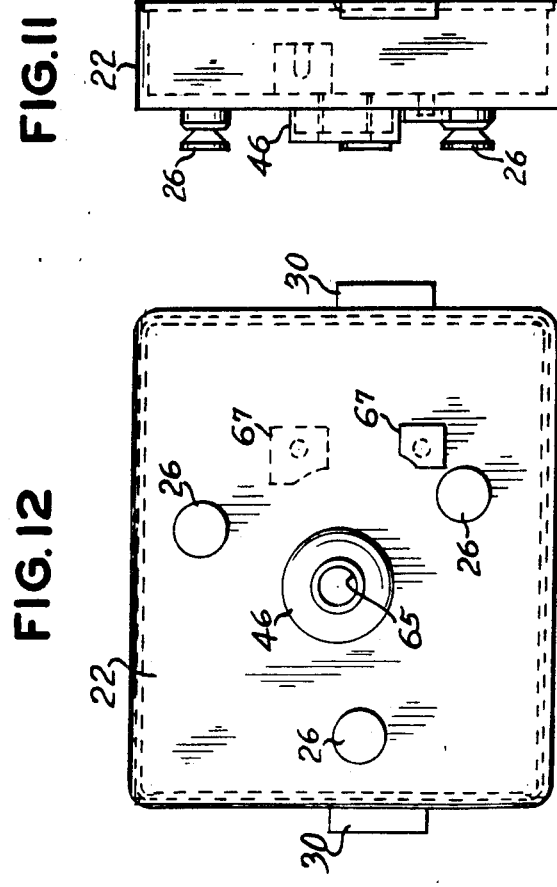
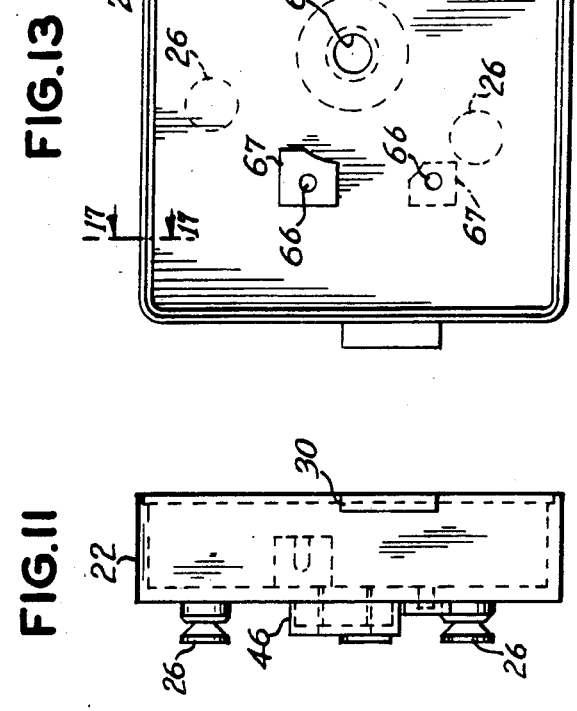
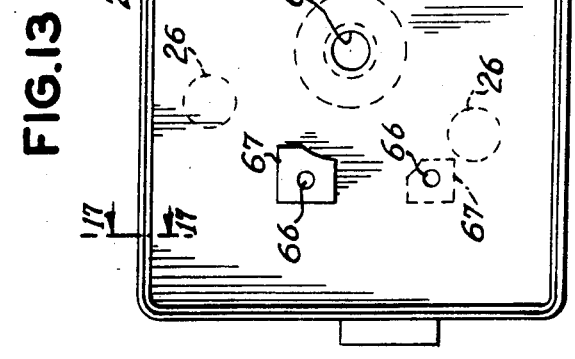
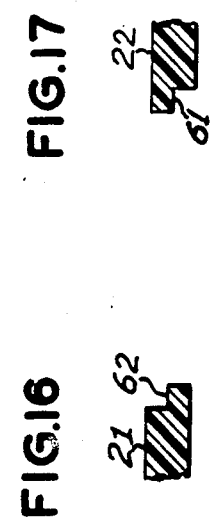
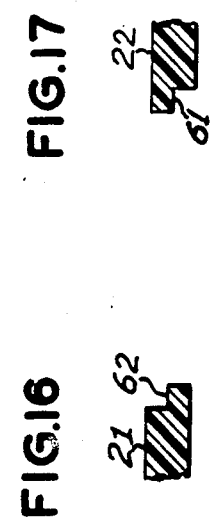

4,708,027

GEAR MOTOR HOUSING

BACKGROUND OF THE INVENTION

Gear motors are used in many residential and industrial applications for the metered introduction of chemicals into a large liquid mass. A typical residential use is in adding chemicals to a swimming pool. When motor maintenance is required by a pool owner, a service man must be called to perform whatever repairs are necessary on the spot, or remove the motor and take it to his shop for repair. These are time-consuming, costly delays which could be avoided if repairs could be made by the owner of the pool regardless of his lack of skill and tools. The lack of repair skill may be handled in many instances by merely replacing a damaged part with a new one. The lack of tools, however, is a problem that has not been easily solved. It is the purpose of this invention to provide a housing that needs only the basic screwdriver for a complete disassembly and repair.

It is, therefore, an object of this invention to provide a novel manually disassembleable housing for a motor. It is another object of this invention to provide a housing that functions as a journal for power shafts but does not need special tools for assembly or disassembly. Still other objects will become apparent from the more detailed description which follows.

BRIEF SUMMARY OF THE INVENTION

This invention relates to a disassembleable housing for a gear motor wherein the gear motor includes an electric motor, a high speed motor shaft, a ventilation fan blade mounted on the motor shaft, a speed reduction gear train operatively connected to the motor shaft, and a low speed output shaft connected to the gear train. The housing includes a gear case cover, a fan and motor cover, and a central support section, the covers being interfitted with two open ends of the central section to form an enclosure for the gear motor. The fan and motor cover has a passageway to permit air to exit from the housing after passing through the central support section. The gear case cover includes a journaled passageway to support the output shaft therethrough and journals are provided for shafts upon which are mounted gears of a gear train. The central support section has a passageway to permit inflow of air from outside the housing to inside the housing, and includes two tapped holes for receiving two screws to mount the motor to the center support section. A journaled passageway through the support section receives the motor shaft for operative connection to the gear train, and journals for the shafts of gears of the gear train are provided. Clamping means on the outside of the housing releasably hold the covers and the central support section together to form an enclosed housing.

In specific aspects the three sections of the housing are clamped together by a pair of oppositely facing pivoting arms on the central section engaging lugs on each of the two end sections. Also, fastening means on the outside of the gear case cover attaches the housing and output shaft to a device to be driven by the output shaft. Shafts for gears and the motor are journaled in the housing such that separation of the housing sections releases the shafts for manual removal. Splice joints are provided about each housing section to firmly connect the three sections together to inhibit lateral displacement.

BRIEF DESCRIPTION OF THE DRAWINGS

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

FIG. 5 is a side elevational view of the fan and motor cover;

FIG. 6 is a front elevational view of the fan and motor cover of the housing;

FIG. 7 is a rear elevational view of the fan and motor cover of FIG. 5;

FIG. 11 is a side elevational view of the gear case cover of the housing;

FIG. 12 is a front elevational view of the gear case cover;

FIG. 13 is a rear elevational view of the gear case cover;

FIG. 14 is an enlarged partial cross sectional view taken along line 14—14 of FIG. 6;

FIG. 15 is an enlarged partial cross sectional view taken along line 15—15 of FIG. 9;

FIG. 16 is an enlarged partial cross sectional view taken along line 16—16 of FIG. 10; and FIG. 17 is an enlarged partial cross sectional view taken along line 17—17 of FIG. 13.

DETAILED DESCRIPTION OF THE INVENTION

Figure 1:
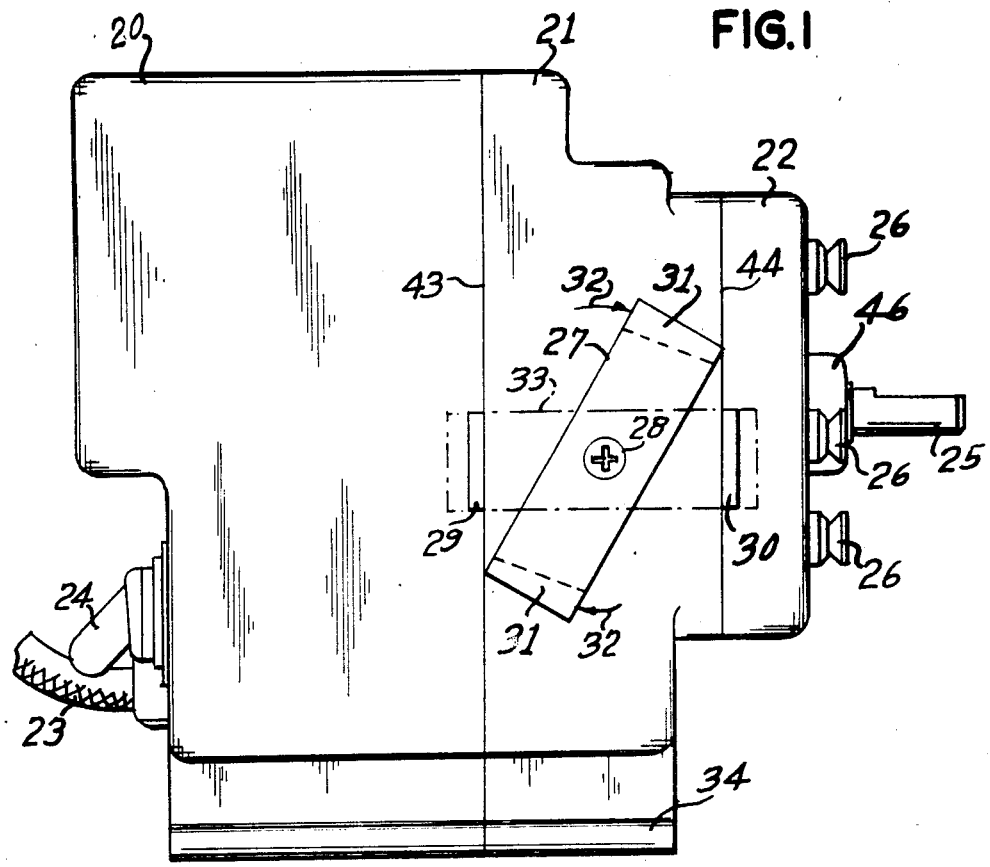
FIG. 1 is a side elevational view of the gear motor housing in accord with this invention.

In FIGS. 1-4 there is shown the overall assembly of the housing of this invention which is designed to enclose a fan cooled motor and a gear reduction unit to drive an output shaft that will power a device. The entire unit of fan, motor, gears, and output shaft is in a housing that is manually attachable to a pump, preferably a peristaltic pump, employed to meter chemicals to be added to a swimming pool system. The housing, fan, motor, gears, and output shaft are assembled in such a fashion that all parts may be disassembled manually with a screwdriver being the only tool needed to disconnect and dismantle same which aids in the maintenance and repair thereof in the field.

It may be seen in FIGS. 1-4 that the housing has three sections; namely, a fan and motor cover 20, a central support section 21, and a gear case cover 22. These three sections meet along parting lines 43 and 44 and are held together by a clamping means in the form of a clamping arm 27 pivoted about screw 28 which is attached to central support section 21. Arm 27 has an undercut or lip edge 31 at each end thereof to engage lug 29 on cover 20 and lug 30 on cover 22. Thus, by turning arm 27 from its unlocked position, shown by solid lines, in the direction of arrows 32, wedge shaped ledges 31 will engage lugs 29 and 31 and thereby clamp all three sections 20, 21, and 22 into a single housing. With this type of clamp, it is preferred to have another such clamping arm and lugs on the opposite side of the housing.

Fan and motor cover 20 includes a means for connecting to an input power line 23 and for a switch 24 electrically coupled to the motor 37. Gear case cover 22 includes a hub 46 for holding a bearing for output shaft 25 and pins 26 for fastening the entire housing to a corresponding housing for a pump. Pins 26 have frustoconical heads that fit into cooperating locking slots in the pump housing and may be clamped by rotating cover 22 to cause pins 26 to become engaged in narrower portions of the slots (See applicant's copending U.S. patent application Ser. No. 794,560 filed Nov. 4, 1985 now U.S. Pat. No. 4,631,008 dated Dec. 23, 1986, FIGS. 8 and 11 for similar slots). The housing is also shown as having two elongated feet 34 which can be slidingly engaged in a track 35 shown in broken lines in FIG. 2, such track 34 being adapted to be rigidly attached to any base and allows the housing sections 20, 21, and 22 to be attached thereto or disengaged therefrom without the need of any tools.

Figure 4:
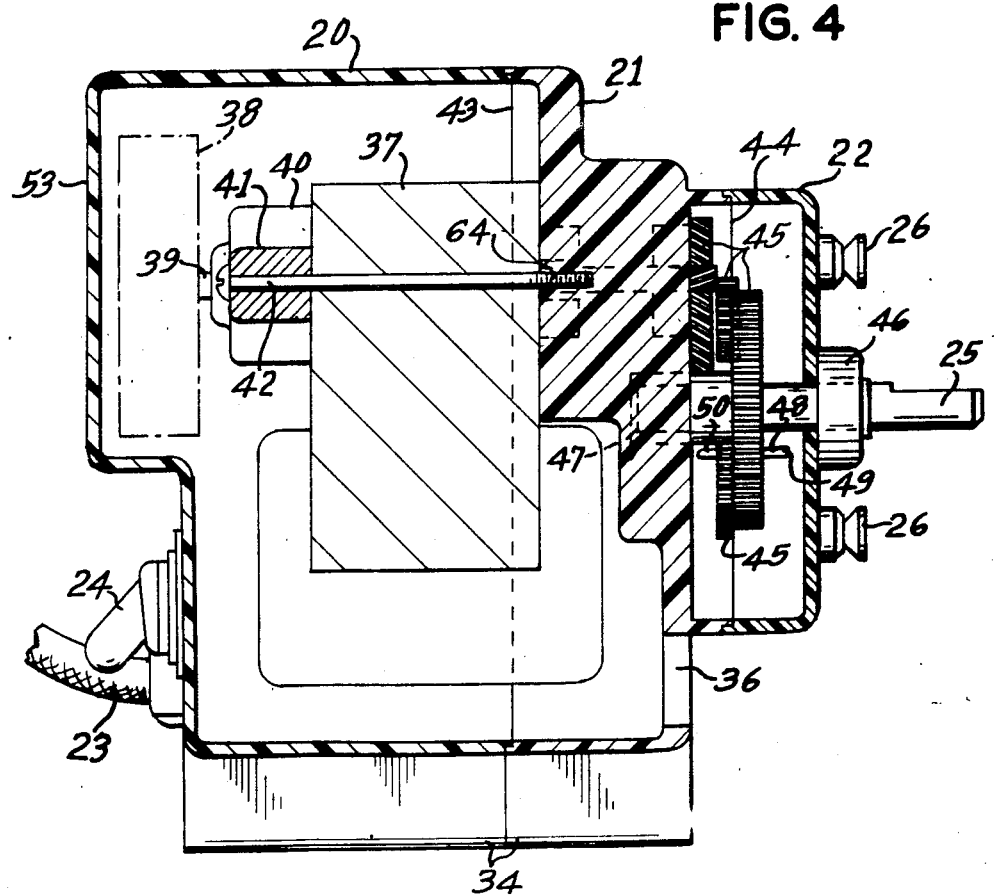
FIG. 4 is a cross sectional view taken along line 4—4 of FIG. 2.

In FIG. 4 the general arrangement of the operating components inside the housing may be seen. Motor 37 is mounted on central support section 21 by two long screws 42 engaged in tapped holes 64 extending entirely through motor 37 from shoulders 41 of bearing hub 40 to tapped holes 64 in a boss inside section 21. Motor 37 includes a high speed shaft 39 that drives a fan 38 and extends out the forward end of motor 37 into the space inside gear case cover 22. A train of gears 45 transforms the high speed of shaft 39 into a lower speed for output shaft 25 which is supported at its inner end 47 by a bearing in the boss of central support section 21. The outer portion of shaft 25 is supported in a bearing in hub 46 of gear case cover 22 and extends beyond hub 46 for suitable connection to a pump (not shown) which it drives. Each of gears 45 is mounted on a shaft which is journaled at one end in gear case cover 22 and at the other end in central support section 21. An example of this is shown with gear 45 on shaft 48 which is journaled at 49 in gear case cover 22 and at 50 in central support section 21. Air is blown around motor 37 by fan 38, with the air entering section 21 through opening 36 in the housing and blown out of housing through louvers 53.

Figure 2:
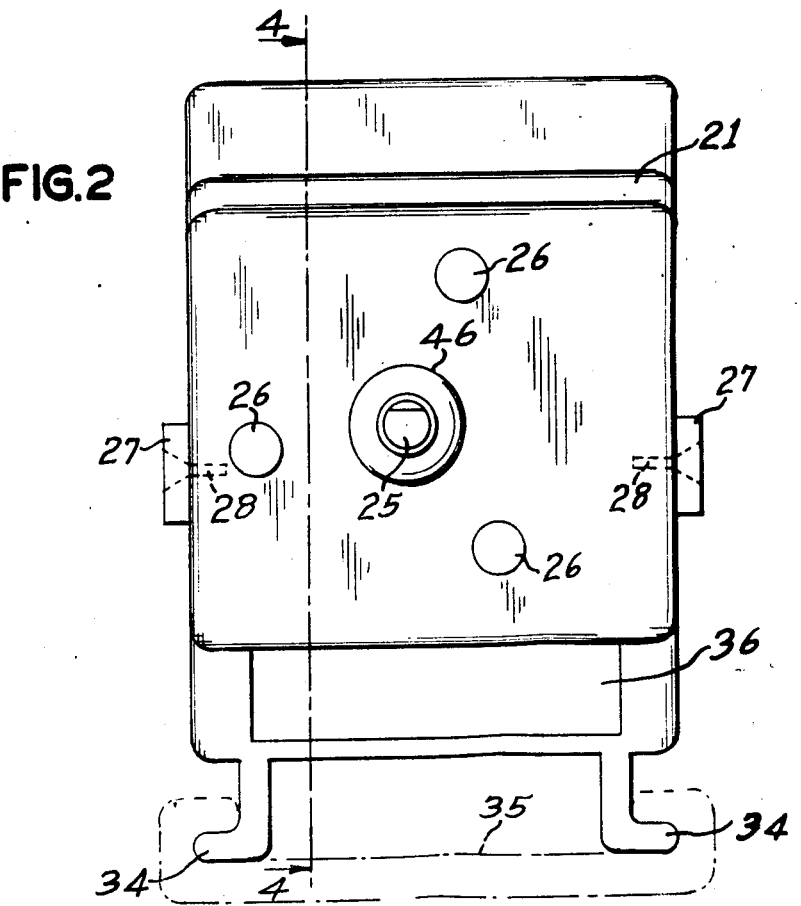
FIG. 2 is a front elevational view of the housing of FIG. 1.
Figure 3:
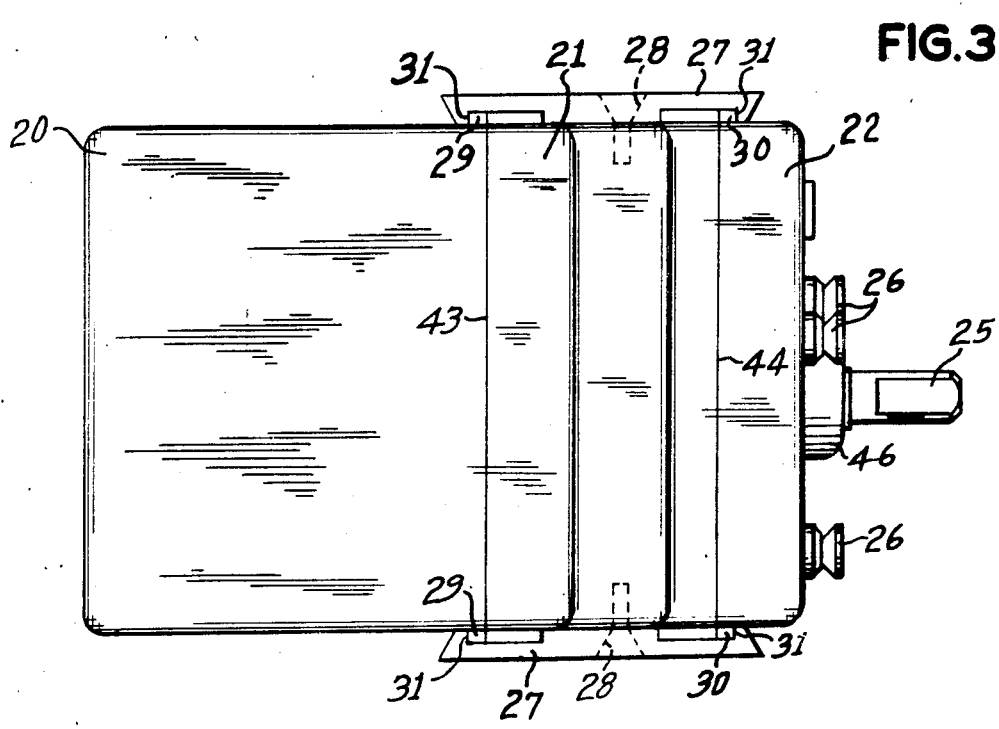
FIG. 3 is a top plan view of the housing of FIGS. 1 and 2.

In FIGS. 5-7 there is shown the general design of fan and motor cover 20. Cover 20 is a hollow shell having lugs 29 on its outside and space inside to admit the rear portion of motor 37 and all of fan 38. Holes 51 and 52 are provided to permit attachment of a switch 24 and an input power line 23, respectively. Louvers 53 permit outflow of air driven by fan 38. Feet 34 permit attachment to a track 35 as shown in FIG. 2. The perimeter 59 around cover 20 is mated with a similar perimeter around section 21 to provide a tight clampable joint in the form of a step-shaped splice joint of FIG. 14 which is mated with the opposite interfitting form shown in FIG. 15.

Figure 10:
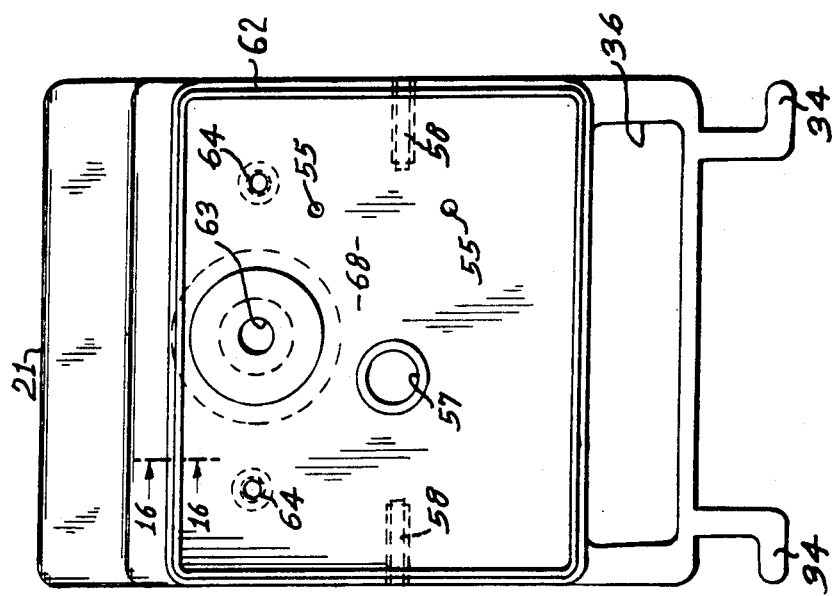
FIG. 10 is a front elevational view of the central support section.
Figure 8:
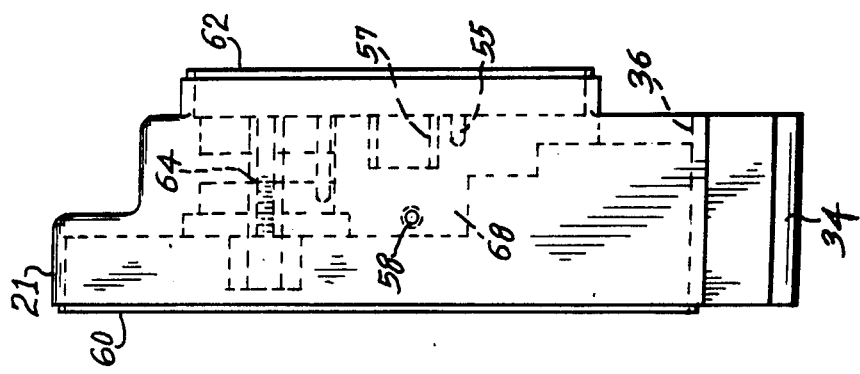
FIG. 8 is a side elevational view of the central support section of the housing.
Figure 9:
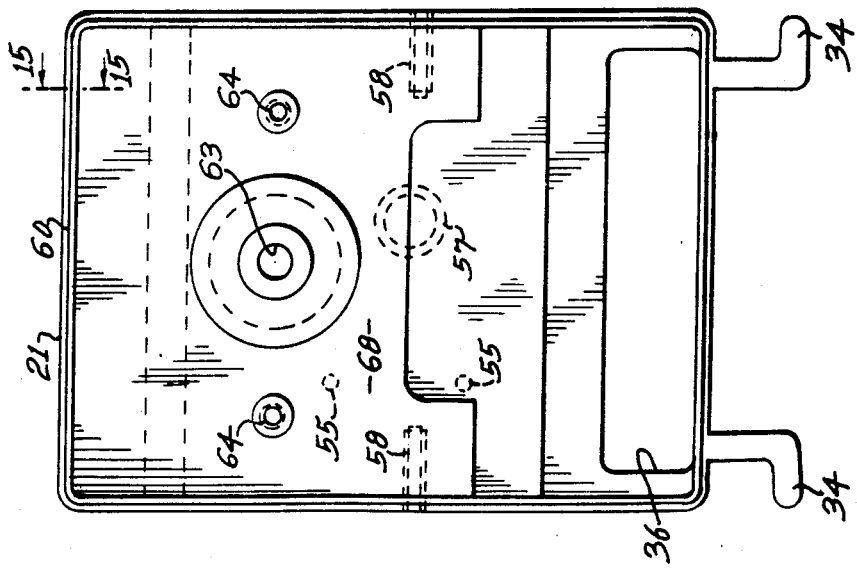
FIG. 9 is a rear elevational view of the central support section.

In FIGS. 8-10 there is shown the detailed structure of central support section 21. Since this section forms the support for fan 38 and motor 37 as well as part of the support for the gear reduction train and the output shaft 25, it will be appreciated that there is a substantial interior solid section 68 into which various holes and recesses are fashioned for supporting the moving parts. Two tapped holes 64 receive long screws 42 (FIG. 4) for supporting motor 37. A recess 56 and a central bore 63 provide a seat for supporting a hub on motor 37 and permitting shaft 39 to extend into gear case cover 22. On the forward side of solid section 68 are a plurality of recesses 55 to receive shafts on which gears of the reducing gear train are mounted. Each recess 55 is merely a bore which does not extend through solid section 68 and may, with appropriate lubrication, function as a journal for the gear shaft. Similarly, recess 57 is provided to support the inboard end of low speed output shaft 25 (see FIG. 4). Preferably, recess 57 is made to enclose a roller or ball bearing case for that end of shaft 25. Tapped holes 58 receive screws 28 around which clamping arms 27 are pivoted as seen in FIG. 1. This central support section 21 has two open perimeters 60 and 62 for mating with similar perimeters of covers 20 and 22. Each of perimeters 60 and 62 is fashioned in a step-shaped splice joint as shown in FIGS. 15 and 16 respectively. When these perimeters 60 and 62 are mated with the corresponding perimeters 59 and 61 on respective covers 20 and 22 the outside surface of the housing along parting lines 43 and 44 is substantially smooth.

In FIGS. 11-13 there is shown the detail of gear case cover 22 formed by a thin cup-shaped section except for a plurality of bosses 67 placed wherever a recess 66 is needed to journal a shaft for a gear, such as shaft 48 for gear 45 in FIG. 4. A hub 46 is for enclosing a bearing to support output shaft 25 passing through hole 65 and extending outwardly to the pump or other apparatus to be driven by shaft 25. On the outside of cover 22 are lugs 30 which are engaged by arms 27 to clamp cover 22 to central support section 21. A plurality of pins 26 project outwardly from the outside face of cover 22. These pins are for connecting the housing of this invention to a corresponding pump housing, as heretofore explained. Pins 26 have a frustoconical head which permits the pin to be inserted into the large portion of a slot and moved to the small portion of that slot which engages the small end of the conical section and thereby fastens the pin to the slot. Three pins 26 are preferred for stability in a manner known in the art. Perimeter 61 is fashioned in a step-shaped splice joint, as seen in FIG. 17, to mate with the opposite joint section on perimeter 62 of section 21, as shown in FIG. 16.

The housing of this invention is preferably made of a tough plastic that is receptive to lubricants. Such plastics include polyethers, polycarbonates, polyacetates, polyamides and other similar materials. A particularly preferred material is "Lexan", a polycarbonate made and sold by General Electric Company. Several advantages of the use of this material is that the motor portion of the housing stays cool and will not burn the hands, like a white metal encased motor of the prior art and the gear motor will continue to operate even though the entire assembly is underwater, etc.

While the invention has been described with respect to certain specific embodiments, it will be appreciated that many modifications and changes may be made by those skilled in the art without departing from the spirit of the invention. It is intended, therefore, by the appended claims to cover all such modifications and changes as fall within the true spirit and scope of the invention.

What is claimed as new and what is desired to secure by Letters Patent is:

1. A disassembleable housing for a gear motor wherein the gear motor includes an electric motor, a high speed motor shaft, a ventilation van blade mounted on the motor shaft, a speed reduction gear train operatively connected to the motor shaft and a low speed output shaft connected to the gear train; said housing comprising only three sections defined by a gear case cover, a fan and motor cover, and a central support section, each said cover having an open end and an oppositely disposed closed end, said open end of said covers interfitting respectively with two open ends of said central section to form an enclosure for said gear motor; said fan and motor cover having a passageway through its said closed end, said fan blade being disposed closely adjacent said passageway for forcing air to exit from said housing; said gear case cover including a journaled passageway to support said output shaft therethrough, journals for shafts upon which are mounted gears of said gear train, said central support section having a passageway to permit inflow of air from outside said housing to inside said housing, said passageway in said central support section being located adjacent said gear case cover and said passageway communicating with space internally of said central support section and said fan and motor cover around said fan motor and thence out said passageway in said fan and motor cover, and including two tapped holes for receiving two screws to mount and suspend said motor to said central support section entirely within space formed between said fan and motor cover and said central support section, a journaled passageway through said support section to receive said motor shaft for operative connection to said gear train, and journals for said shafts for gears of said gear train and said output shaft; and manually movable clamping means disposed outwardly of and positively attached to said housing to clamp each of said covers to said central support section to form said disassembleable housing.

2. The housing of claim 1 wherein said clamping means includes an elongated arm pivot means for attaching said arm to said central support section, said arm having a lip at one of its ends facing said housing, a lug attached to one of said covers of said housing and adapted to be slidingly engaged with said lip when said arm is pivoted to be adjacently overlying said lug.

3. The housing of claim 1 wherein said clamping means includes an elongated arm having opposite end portions, pivot means generally medially of said arm to pivotally connect said arm to said central support section, said arm having a lip adjacent each said arm end portion, a lug attached to said covers and extending outwardly of said housing, said lips engaging respective said lugs when said arm forcibly clamps said covers to and towards said central support section.

4. The housing of claim 1 wherein said clamping means includes a pair of elongated arms each having opposite end portions, a pair of pivot means generally medially of respective said arms to pivotally connect said arms to and on opposite sides of said central support section, each said arm having a lip adjacent each said arm end portion, a pair of oppositely disposed lugs attached to each of said covers and extending outwardly of said housing, said lips engaging respective said lugs on the same side when respective said arm forcibly clamps said covers to and towards sand central support section.

5. The housing of claim 1 further comprising fastening means outwardly of said gear case cover to attach said housing and said output shaft to a device to be driven by said output shaft.

6. The housing of claim 5 wherein said fastening means includes a plurality of spaced elongated pins each having an inner end attached to said gear case cover and projecting outwardly of said gear case cover to a free outer end, each pin having a head portion at the outer end joined to a reduced diameter central portion by a tapered conical surface.

7. The housing of claim 1 wherein said journals for mounting said gears of said gear train are aligned cooperating recesses in said central support section and in said gear case cover adapted to hold said shafts in fixed positions when said section and said cover are clamped together and to be readily manually disassembleable when said section and said cover are separated, said journal of said central support section for said output shaft being a recess aligned with said journaled passageway.

8. The housing of claim 1 further comprising splice joint means around all contiguous perimeters of each mating surface of each said central support section and each of said fan and motor cover and said gear case cover to interfit said covers to said central support section and provide a substantially smooth outer surface for said housing.

9. The housing of claim 8 further comprising another outstanding lug means from each said end section generally oppositely disposed from respective said lug means, another elongated pivotable arm attached to said central support section and having an inwardly facing lip at each end thereof to engage a corresponding other lug means on each of said end sections.

10. The housing of claim 9 further comprising means for pivotally attaching each said arm to said central support section with each said means being located generally oppositely on respective sides of said central section.

11. The housing of claim 10 wherein said lip is wedge shaped, and wherein said arm is pivotal in one direction to tightly clamp said lug means toward said central support section and to release same upon rotation opposite to said one direction.

12. The housing of claim 1 wherein said clamping means includes an elongated arm said means for movably connecting including a pivot member attaching said arm to said central support section, said arm having a lip at one of its ends facing said housing, a lug attached to one of said covers and adapted to be slidingly engaged with said lip when said arm is pivoted to be engaging in generally overlying relation with said lug.

13. The housing of claim 1 wherein said clamping means includes an elongated arm having opposite end portions, means generally medially of said arm to pivotally connect said arm to said central support section, said arm having a lip adjacent each said arm end portion, a lug attached to each of said covers of said housing and being generally aligned with each other and with said means to pivotally connect, said lips engaging respective said lugs when said arm clamps said covers to said central support section with said lips engaging and generally overlying said lugs.

14. The housing of claim 1 wherein said clamping means includes a pair of elongated arms each having opposite end portions, means generally medially of each of said arms to pivotally connect said arms to said central support section on opposite sides thereof, each said arm having a lip adjacent each said arm end portion, a pair of lugs attached to each of said covers of said housing and being generally aligned with each other and with said means to pivotally connect, said lips of each said arm engaging respective said lugs of each said covers when said arms clamp said covers to said central support section with said lips engaging and generally overlying respective said lugs.

15. A manually disassembleable housing for a gear motor which includes an electric motor with a shaft therethrough, an air circulation fan connected to one end of the shaft and a reduction gear train connected to the other end and an output low speed shaft from the gear train to outside said housing; said housing comprising three interfiting sandwiching sections which, when assembled, totally enclosed said gear motor, said three sections forming respectively a gear case cover and a fan and motor cover as the end sections and a central support section between said end sections; each of said end sections having an open end and an opposite closed end, said central support section having oppositely disposed open ends, each said end section open end respectively interfitting with an adjacent section open end of said central support section around their respective open perimeters by splice joints, each said end section including an outstanding lug means for attachment to said central section, an elongated pivotable arm attached to said central support section and having an inwardly facing lip at each end thereof to engage a corresponding lug means on each of said end sections; screw means for fasening said motor internally of and suspended to said central support section, said gear train including a plurality of cooperating gears rotating on shafts journaled at one end in and to said central support section and at the other end in and to said gear case cover, said output shaft having one end journaled in and through said gear case cover thereof and another end journaled in said central support section; said gear shafts and said output shaft being readily and manually removable from their respective journals when said gear case cover is separated from said central support section; said central support section having an air inlet passageway adjacent said splice joint with said gear case cover and an air outlet through said closed end of said fan and motor cover adjacent said fan.

16. The housing of claim 15 wherein an outer periphery of said central support section and of said fan and motor cover end section is spaced outwardly from said motor to provide air circulation space around said motor.

* * * * *